April 15, 1952    H. BENDER ET AL    2,593,001
PROCESS FOR MANUFACTURE OF A DIPHENYL SULFONE
Filed Jan. 31, 1950
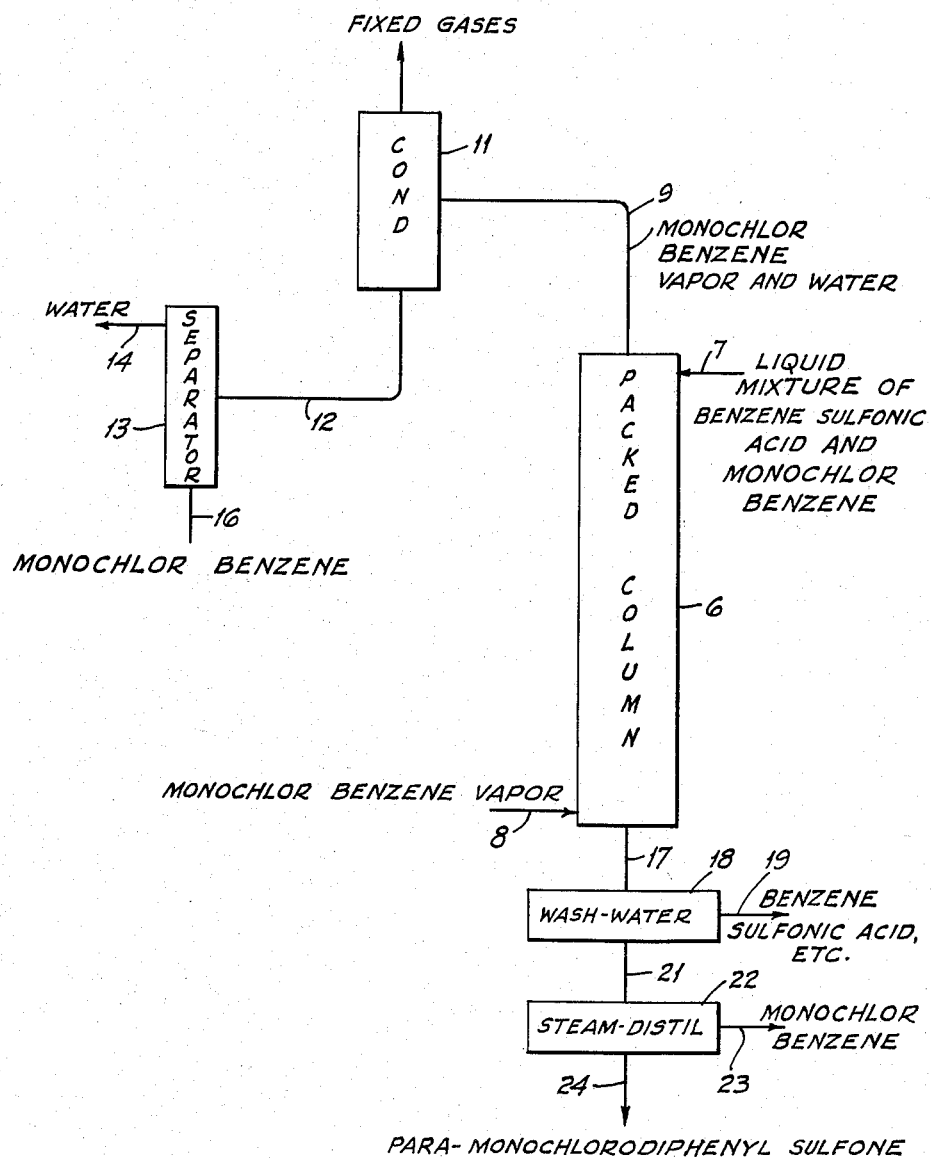
INVENTORS
Harry Bender
Harold M. Pitt
BY
ATTORNEY Patented Apr. 15, 1952

2,593,001

UNITED STATES PATENT OFFICE 2,593,001

PROCESS FOR MANUFACTURE OF A DIPHENYL SULFONE

Harry Bender and Harold M. Pitt, Torrance, Calif., assignors to Stauffer Chemical Company, a corporation of California Application January 31, 1950, Serial No. 141,506

10 Claims. (Cl. 260—607)

This invention relates to a continuous process for the manufacture of sulfones such as p-monochlorodiphenyl sulfone, diphenyl sulfone and dichlorodiphenyl sulfone.

It is an object of the present invention to provide a continuous process for the manufacture of p-monochlorodiphenyl sulfone, particularly one enabling a product to be produced having a relatively high percentage of this compound. The manufacture of this material has been previously reported in the literature by Meyer, Annalen, vol. 433, pg. 327 et seq. (1927), who reported that he obtained "good yields" of the material. However, upon carefully attempting to follow Meyer's teachings, we have not been able to secure what we consider as such "good yields" and we have therefore turned our attention to improvement of the process. We have found that the process should preferably be carried on continuously, the quantity of water present at any instant in the reaction zone should be held to a minimum and, additionally, the yield is increased when the process is carried on under an elevated pressure. We achieve removal of the water by feeding one of the reactants, benzene sulfonic acid, as an anhydrous liquid; this is attained by mixing the anhydrous benzene sulfonic acid with sufficient of the other reactant, monochlorobenzene, to provide a liquid mixture which is then fed into the reaction zone. We also introduce into the reaction zone and pass counter-current to the benzene sulfonic acid, a stream of monochlorobenzene vapor of sufficient volume to sweep out of the reaction zone the water liberated during the reaction.

We have also ascertained that the process is one which is best carried on under a pressure which is relatively elevated with respect to atmospheric, and we prefer to utilize pressures of the order of 6 to 15 pounds gauge, although one can utilize successfully pressures of as much as 35 to 40 pound gauge.

Further objects and advantages of the present invention will become apparent in the following wherein a further detailed description of the process of this invention is set forth in conjunction with the drawing in which the single view is a diagram of a suitable apparatus and flow sheet which can be employed.

Referring to the drawing, a packed vertical column 6 is provided into which a liquid mixture of benzene sulfonic acid and monochlorobenzene is introduced through line 7. A stream of monochlorobenzene vapor is introduced into the bottom of the column through line 8, the two streams passing counter-current to one another, the monochlorobenzene should be anhydrous and we usually dry it to a water content below 25 parts per million. The unreacted monochlorobenzene vapor carrying the water liberated during the reaction issues from the top of column through line 9 and passes into a condenser 11. The condensed water and monochlorobenzene are drawn off through line 12 into a separator 13, the water being taken off through line 14 at the top of the separator and the monochlorobenzene being taken off through line 16, and sent to an azeotropic dryer (not shown), and from which it is vaporized and returned to the reaction zone.

The product issues through line 17 from the bottom of the column at about 210°–220° C. and is washed with water in a washer 18 and the benzene sulfonic acid and other by-products are taken off through line 19, the remaining product being passed through line 21 to a steam distillation vessel 22, wherein removal of the monochlorobenzene by vaporization is achieved, the product being taken off through line 24.

The benzene sulfonic acid mixture introduced at the top of the reaction column should contain at least about 25% by weight of monochlorobenzene, to insure its being a liquid at the temperature at which it is introduced into the reaction zone; the monochlorobenzene content of the benzene sulfonic acid can be increased to as much as 20%–40% and even more by weight of the benzene sulfonic acid.

The monochlorobenzene vapor introduced through the bottom of the reaction column should be at least twice that required stoichiometrically to react with the benzene sulfonic acid and produce the desired p-monodichlorophenyl sulfone; one can use as much as ten times the quantity of monochlorobenzene vapor to sweep out the water. However, one reaches a point whereat the added vapor cannot be circulated economically due to the heat requirements.

The following specific examples are set forth by way of illustration and not by way of limitation.

*Example 1.*—A reaction column 6 was set up having an internal diameter of 31 millimeters and being 84 centimeters long. It was packed with $\frac{3}{16}$" glass helices; the column was wound with Nichrome wire, enabling it to be heated electrically to 260° C. Into the column, 6.27 grams per minute of benzene sulfonic acid was fed at atmospheric pressure through line 7, the acid being anhydrous; the acid contained 2.8% of diphenyl sulfone and an equimolal amount of monochlorobenzene, or 4.5 grams. The monochlorobenzene vapor was fed at the rate of 88 grams per minute at a temperature of 200° C. through line 8 at the base of the column; the ratio of monochlorobenzene to benzene sulfonic acid was 14 to 1. The product was removed from the bottom of the column at the rate of 5 grams per minute. It contained 72% by weight of the desired p-monochlorodiphenyl sulfone. The reaction time was from 3 to 4 minutes.

*Example 2.*—Utilizing the same equipment as in Example 1, but a feed rate of 3.14 grams per minute of the benzene sulfonic acid containing 5.8% of diphenyl sulfone, the monochlorobenzene vapor was introduced at the bottom of the column at the rate of 38 grams per minute or a ratio of 12 to 1. The column was maintained at a temperature of 250° C., as was the monochlorobenzene vapor. The yield was 2.66 grams per minute of p-monochlorodiphenyl sulfone in a reaction time of 3 to 4 minutes.

By increasing the pressure, the quantity of monochlorodiphenyl sulfone in the final product can be increased. For example, by increasing the pressure to 6 pounds gauge the p-monochlorodiphenyl sulfone content was increased to 79%.

As we have indicated, the process can be employed to manufacture other sulfones such as dichlorodiphenyl sulfone and diphenyl sulfone and the following examples are illustrative of this:

*Example 3.*—Utilizing the same equipment as in Example 1, benzene vapor, preheated to 265°–270° C., was fed in at the base of the column at the rate of 70–75 c. c. per minute, the column being heated to 260° C. At the top of the column, 304 grams per hour of 95% sulfuric acid was fed into produce 561 grams of diphenyl sulfone and 215 grams of benzene issued through line 9, sweeping out the water from the reaction zone; this excess should be from twice to ten times that required in the reaction as a reactant.

*Example 4.*—Utilizing the apparatus set-up of Example 1, the column being heated to 262° C., 302 grams of 100% sulfuric acid per hour were fed as 95–96% acid and 88 grams per minute of monochlorobenzene were fed at the bottom of the column, being preheated to 270° C. The yield was 715 grams per hour of product, 372 grams of 4,4' dichlorodiphenyl sulfone and 348 grams of monochlorobenzene sulfonic acid.

In place of benzene or monochlorobenzene, one can feed in any other halogenated benzene in vapor form while benzene sulfonic acid, any halogenated benzene sulfonic acid or sulfuric acid can be fed in at the top, sufficient diluent benzene or bottom fed material being added to provide a liquid top feed. The bottom fed material should be a vapor and in excess of that required by the stoichiometry of the reaction by from two to ten times or more.

We claim:

1. A process for the manufacture of para-monochlorodiphenyl sulfone comprising passing liquid benzene sulfonic acid continuously into a reaction zone, passing anhydrous monochlorobenzene vapor continuously into said reaction zone counter-current to the benzene sulfonic acid, the volume of monochlorobenzene vapor introduced into said zone being at least twice that volume required stoichiometrically to react with said benzene sulfonic acid to form para-monochlorodiphenyl sulfone, removing unreacted monochlorobenzene vapor from said zone to remove water from said zone, removing unreacted benzene sulfonic acid containing para-monochlorodiphenyl sulfone from said zone and recovering the para-monochlorodiphenyl sulfone.

2. A process for the manufacture of para-monochlorodiphenyl sulfone comprising passing liquid benzene sulfonic acid continuously into a reaction zone, passing anhydrous monochlorobenzene vapor continuously into said reaction zone counter-current to the benzene sulfonic acid, the volume of monochlorobenzene vapor introduced into said zone being from about two to about ten times that volume required stoichiometrically to react with said benzene sulfonic acid to form para-monochlorodiphenyl sulfone, removing unreacted monochlorobenzene vapor from said zone to remove water from said zone, removing unreacted benzene sulfonic acid containing para-monochlorodiphenyl sulfone from said zone and recovering the para-monochlorodiphenyl sulfone.

3. A process for the manufacture of para-monochlorodiphenyl sulfone comprising passing liquid benzene sulfonic acid continuously into a reaction zone, passing anhydrous monochlorobenzene vapor continuously into said reaction zone to react with the benzene sulfonic acid and form water and para-monochlorodiphenyl sulfone, maintaining said reaction zone under a pressure elevated above atmospheric and from about 3 to 35 pounds gauge, the volume of monochlorobenzene vapor introduced into said zone being at least twice that volume required stoichiometrically to react with said benzene sulfonic acid to form para-monochlorodiphenyl sulfone, removing unreacted monochlorobenzene vapor from said zone to remove water from said zone, removing unreacted benzene sulfonic acid containing para-monochlorodiphenyl sulfone from said zone, and recovering the para-monochlorodiphenyl sulfone.

4. A process for the manufacture of para-monochlorodiphenyl sulfone comprising passing liquid benzene sulfonic acid continuously into a reaction zone, passing anhydrous monochlorobenzene vapor continuously into said reaction zone to react with the benzene sulfonic acid and form water and para-monochlorodiphenyl sulfone, maintaining said reaction zone under a pressure elevated above atmospheric and from about 6 to about 15 pounds gauge, the volume of monochlorobenzene vapor introduced into said zone being at least twice that volume required stoichiometrically to react with said benzene sulfonic to form para-monochlorodiphenyl sulfone, removing unreacted monochlorobenzene vapor from said zone to remove water from said zone, removing unreacted benzene sulfonic acid containing para - monochlorodiphenyl sulfone from said zone, and recovering the para-monochlorodiphenyl sulfone.

5. A process for the manufacture of para-monochlorodiphenyl sulfone comprising passing a liquid mixture of benzene sulfonic acid containing at least about 25%–40% by weight of monochlorobenzene continuously into a reaction zone, passing anhydrous monochlorobenzene vapor continuously into said reaction zone counter-current to the benzene sulfonic acid, the volume of monochlorobenzene vapor introduced into said zone being at least twice that volume required stoichiometrically to react with said benzene sulfonic acid to form para-monochlorodiphenyl sulfone, removing unreacted monochlorobenzene vapor from said zone to remove water from said zone, removing unreacted benzene sulfonic acid containing para-monochlorodiphenyl sulfone from said zone, and recovering the para-monochlorodiphenyl sulfone.

6. A process for the manufacture of para-monochlorodiphenyl sulfone comprising passing liquid benzene sulfonic acid continuously into an upper portion of a reaction zone through which said liquid descends gravitally, passing anhydrous monochlorobenzene vapor continuously into a lower portion of said reaction zone and through which said monochlorobenzene vapor ascends against the descending stream of benzene sulfonic acid, the volume of monochlorobenzene vapor introduced into said zone being at least twice that volume required stoichiometrically to react with said benzene sulfonic acid to form para-monochlorodiphenyl sulfone, removing unreacted monochlorobenzene vapor from said zone to remove water from said zone, removing unreacted benzene sulfonic acid containing para-monochlorodiphenyl sulfone from said zone, and recovering the paramonochlorodiphenyl sulfone.

7. A process comprising spraying a first material selected from the group consisting of sulfuric acid and a benzene sulfonic acid continuously as a liquid into a reaction zone, passing anhydrous vapor of a second material selected from the group consisting of benzene and a halogenated benzene continuously into said reaction zone counter-current to the first material, the volume of the second material introduced into said zone being at least twice that volume required stoichiometrically to react with said first material, removing unreacted vapor of the second material from said zone to remove water from said zone, removing unreacted first material containing a reaction product from said zone, and recovering the reaction product.

8. A process comprising spraying a first material selected from the group consisting of sulfuric acid and a benzene sulfonic acid continuously as a liquid into a reaction zone, passing anhydrous vapor of a second material selected from the group consisting of benzene and a halogenated benzene continuously into said reaction zone counter-current to the first material, the volume of said vapor introduced into said zone being from about two to about ten times that volume required stoichiometrically to react with said first material, removing unreacted second material vapor from said zone to remove water from said zone, removing unreacted first material containing a reaction product from said zone, and recovering said product.

9. A process comprising spraying a first material selected from the group consisting of sulfuric acid and a benzene sulfonic acid continuously as a liquid into an upper portion of a reaction zone through which said liquid descends gravitally, passing anhydrous vapor of a second material selected form the group consisting of benzene and a halogenated benzene continuously into a lower potrion of said reaction zone and through which said vapor ascends against the descending stream of liquid, the volume of vapor introduced into said zone being at least twice that volume required stoichiometrically to react with said first material, removing unreacted vapor from said zone to remove water from said zone, removing first material containing a reaction product from said zone and recovering the product.

10. A process for the manufacture of a dichlorodiphenyl sulfone comprising passing sulfuric acid continuously into a reaction zone, passing anhydrous monochlorobenzene vapor continuously into said reaction zone to react with the acid and form water and dichlorodiphenyl sulfone, the volume of monochlorobenzene vapor introduced into said zone being at least twice that volume required stoichiometrically to react with said acid to form dichlorodiphenyl sulfone, removing unreacted monochlorobenzene vapor from said zone to remove water from said zone, removing unreacted acid containing dichlorodiphenyl sulfone from said zone, and recovering the dichlorodiphenyl sulfone.

HARRY BENDER.
HAROLD M. PITT.

REFERENCES CITED

The following references are of record in the file of this patent:

UNITED STATES PATENTS

| Number | Name | Date |
|---|---|---|
| 2,000,061 | Carr | May 7, 1935 |
| 2,122,958 | Schafer | July 5, 1938 |

OTHER REFERENCES

Heymann et al., J. Am. Chem. Soc., vol. 67, pages 1979-86 (1945).